United States Patent
Krutsch et al.

(10) Patent No.: US 9,836,808 B2
(45) Date of Patent: Dec. 5, 2017

(54) APPARATUS AND METHOD FOR VERIFYING IMAGE DATA COMPRISING MAPPED TEXTURE IMAGE DATA

(71) Applicant: FREESCALE SEMICONDUCTOR, INC., Austin, TX (US)

(72) Inventors: Robert Cristian Krutsch, Munich (DE); Oliver Bibel, Grasbrunn (DE); Rolf Dieter Schlagenhaft, Poing (DE)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/746,980

(22) Filed: Jun. 23, 2015

(65) Prior Publication Data

US 2016/0379332 A1    Dec. 29, 2016

(51) Int. Cl.

| | |
|---|---|
| G06T 1/20 | (2006.01) |
| G09G 5/02 | (2006.01) |
| G09G 5/36 | (2006.01) |
| G06T 11/40 | (2006.01) |
| G06T 11/00 | (2006.01) |
| G06T 7/00 | (2017.01) |
| G06T 15/00 | (2011.01) |
| G06T 15/04 | (2011.01) |
| G09G 5/395 | (2006.01) |
| G09G 5/397 | (2006.01) |

(52) U.S. Cl.
CPC .............. *G06T 1/20* (2013.01); *G06T 7/00* (2013.01); *G06T 11/001* (2013.01); *G06T 11/40* (2013.01); *G06T 15/005* (2013.01); *G06T 15/04* (2013.01); *G09G 5/02* (2013.01); *G09G 5/363* (2013.01); *G09G 5/395* (2013.01); *G09G 5/397* (2013.01); *B60R 2300/00* (2013.01); *G06T 2207/10024* (2013.01); *G09G 2360/08* (2013.01); *G09G 2360/18* (2013.01)

(58) Field of Classification Search
None
See application file for complete search history.

(56) References Cited

U.S. PATENT DOCUMENTS

| 5,864,342 A | 1/1999 | Kajiya et al. |
|---|---|---|
| 5,875,295 A | 2/1999 | Devic |

(Continued)

FOREIGN PATENT DOCUMENTS

WO    2009145916 A1    12/2009

OTHER PUBLICATIONS

International Search Report and Written Opinion for PCT/IB2013/050143 dated Oct. 24, 2013, 13 pages.

(Continued)

*Primary Examiner* — Hilina K Demeter (57) ABSTRACT

The present application relates to an apparatus for verifying the integrity of image data comprising mapped texture data is provided and a method of operating thereof. A fragment shader unit is coupled to first and second frame buffers and at least one texture buffer. A first texture sampler unit is configured to output texture mapped fragments to the first frame buffer. A second texture sampler unit is configured to output texture mapped fragments to the second frame buffer. A comparator unit is further configured to compare the image data stored in the first frame buffer and in the second frame buffer. A fault indication signal is issued in case the image data of the first and the second frame buffers mismatch.

17 Claims, 5 Drawing Sheets

(56) References Cited

U.S. PATENT DOCUMENTS

| | | | |
|---|---|---|---|
| 6,191,795 B1 | 2/2001 | Liepa | |
| 6,516,093 B1 | 2/2003 | Pardas et al. | |
| 6,664,975 B1 | 12/2003 | Hatch | |
| 7,643,033 B2* | 1/2010 | Sekine | G06T 15/04 345/582 |
| 7,777,750 B1* | 8/2010 | Brown | G06T 15/04 345/522 |
| 7,986,325 B1* | 7/2011 | Gold | G06T 1/60 345/506 |
| 8,477,149 B2 | 7/2013 | Beato et al. | |
| 8,896,605 B2 | 11/2014 | Hao et al. | |
| 8,933,934 B1 | 1/2015 | Hill et al. | |
| 2001/0027381 A1 | 10/2001 | Kikuchi et al. | |
| 2002/0131640 A1 | 9/2002 | Wilt | |
| 2005/0143654 A1 | 6/2005 | Zuiderveld et al. | |
| 2005/0151839 A1* | 7/2005 | Ito | G06T 15/04 348/51 |
| 2005/0231504 A1* | 10/2005 | Heng | G06T 15/04 345/420 |
| 2007/0014446 A1 | 1/2007 | Sumanaweera et al. | |
| 2007/0200864 A1* | 8/2007 | Tucker | G06T 15/00 345/582 |
| 2008/0095237 A1* | 4/2008 | Hussain | G06T 15/04 375/240.16 |
| 2009/0070079 A1 | 3/2009 | Harada | |
| 2009/0128570 A1 | 5/2009 | Chen | |
| 2009/0189888 A1 | 7/2009 | Dollner | |
| 2010/0045636 A1* | 2/2010 | Noguchi | G06F 11/327 345/179 |
| 2010/0138376 A1 | 6/2010 | Avis et al. | |
| 2010/0188404 A1 | 7/2010 | Tong et al. | |
| 2010/0275224 A1 | 10/2010 | Sheng et al. | |
| 2011/0063452 A1 | 3/2011 | Fifis et al. | |
| 2011/0115806 A1 | 5/2011 | Rogers | |
| 2012/0206572 A1 | 8/2012 | Russell | |
| 2013/0063460 A1 | 3/2013 | Marison et al. | |
| 2013/0106880 A1 | 5/2013 | Williams | |
| 2014/0146062 A1 | 5/2014 | Kiel et al. | |
| 2014/0267343 A1* | 9/2014 | Arcas | G06T 11/001 345/582 |
| 2016/0148335 A1 | 5/2016 | Huang et al. | |

OTHER PUBLICATIONS

"Graphic Engine Resource Management," by Mikhail Bautin, Ashok Dearakinath, Tzi-Cker Chiuch; Stony Brook University Computer Scient Department, 12 pages.

"TimeGraph: GPU Scheduling for Real-Time Multi-Tasking Environments," by Shinpei Kato, Karthik Lakshmanan, Ragunathan Rajkumar; Proceedings of the 2011 USENIX Conference on USENIX Annual Technical Conference; 14 pages.

"Argus-G: A Low-Cost Error Detection Scheme for GPGPUs" by Ralph Nathan and Daniel J. Sorin, WRA '10, Dec. 4-8, 2010, Atlanta, Georgia, U.S.A., ACM 1-58113-000-0/00/0010.

"Warped-DMR: Light-weight Error Detection for GPGPU" by Hyeran Jeon and Murali Annavaram, IEEE/ACM 45th Annual International Symposium on Microarchitecture, 2012, pp. 37-47.

"Understanding software approaches for GPGPU reliability" by Martin Dimitrov et al., GPGPU'09 Mar. 8, 2009, Washington, DC, USA, ACM 978-1-60558-517-8/09/03.

"A Software-Based Self Test of CUDA Fermi GPUs" by Stefano Di Carlo et al., 18th IEEE European Test Symposium (ETS), 2013, IEEE 978-1-4673-6377-8/13.

"A Hardware Redundancy and Recovery Mechanism for Reliable Scientific Computation on Graphics Processors", Jeremy W. Sheaffer et al., Graphics Hardware (GH), 2007, ACM 978-1-59593-625-7/07/0008.

"The Visual Vulnerability Spectrum: Characterizing Architectural Vulnerability for Graphics Hardware" by Jeremy W. Sheaffer et al., Graphics Hardware (GH), 2006, The Eurographics Association.

"Vulnerability analysis of GPU computing" by Michael Patterson, PhD Thesis, 2013, Iowa State University; in particular pp. 21-33.

"CASP: concurrent autonomous chip self-test using stored test patterns" by Yanjing Li et al., Design, Automation and Test in Europe, 2008, DATE '08, pp. 885-890, IEEE 978-3-9810801-3-1.

"On Testing GPU Memory for Hard and Soft Errors" by Guochun Shi et al., Symposium on Application Accelerators in High-Performance Computing (SAAHPC'09) at National Center for Supercomputing Applications, University of Illinois at Urbana-Champaign, Jul. 28-30, 2009.

"Verifying GPU kernels by test amplification" by Alan Leung et al., Programming Language Design and Implementation PLDI'12, Jun. 11-16, 2012, Beijing, China, ACM 978-1-4503-1205-9/12/06.

U.S. Appl. No. 14/746,948, Krutsch, R. et al., "Apparatus and Method for Verifying the Integrity of Transformed Vertex Data in Graphics Pipeline Processing", Office Action—Non-Final Rejection, dated Oct. 3, 2016.

U.S. Appl. No. 14/747,003, Krutsch, R. et al., "Apparatus and Method for Verifying Fragment Processing Related Data in Graphics Pipeline Processing", Office Action—Non-Final Rejection, dated Sep. 29, 2016.

U.S. Appl. No. 14/747,023, Krutsch, R. et al., "Apparatus and Method for Verifying the Origin of Texture Map in Graphics Pipeline Processing", Office Action—Non-Final Rejection, dated Nov. 3, 2016.

U.S. Appl. No. 14/648,713, Krutsch, R. et al., "Method and Apparatus for Estimating a Fragment Count for the Display of At Least One Three-Dimensional Object", Office Action—First Action Interview Pilot Program Pre-Interview Communication, dated Aug. 18, 2016.

First Action Interview Office Action dated Oct. 17, 2016 for U.S. Appl. No. 14/648,713, 7 pages.

Extended European Search Report for Application No. 16171160.1-1502, dated Nov. 18, 2016, 9 pages.

Extended European Search Report for Application No. 16171168.4-1502, dated Nov. 30, 2106, 7 pages.

Final office action dated May 4, 2017 in U.S. Appl. No. 14/747,023.

Final office action dated Apr. 20, 2017 in U.S. Appl. No. 14/746,948.

Final office action dated Apr. 21, 2017 in U.S. Appl. No. 14/747,003.

Notice of Allowance dated Jul. 28, 2017 for U.S. Appl. No. 14/648,713, 33 pages.

Non-Final Office Action dated Sep. 29, 2016 for U.S. Appl. No. 14/747,003, 22 pages.

Non-Final Office Action dated Sep. 19, 2017 for U.S. Appl. No. 14/747,023, 40 pages.

* cited by examiner

APPARATUS AND METHOD FOR VERIFYING IMAGE DATA COMPRISING MAPPED TEXTURE IMAGE DATA

CROSS REFERENCE TO RELATED APPLICATIONS

The present application is related to the following co-pending U.S. Patent Applications: U.S. patent application Ser. No. 14/648,713, entitled "METHOD AND APPARATUS FOR ESTIMATING A FRAGMENT COUNT FOR THE DISPLAY OF AT LEAST ONE THREE-DIMENSIONAL OBJECT," filed on Jun. 1, 2015; U.S. patent application Ser. No. 14/746,948, entitled "APPARATUS AND METHOD FOR VERIFYING THE INTEGRITY OF TRANSFORMED VERTEX DATA IN GRAPHICS PIPELINE PROCESSING," filed on Jun. 23, 2015; U.S. patent application Ser. No. 14/747,023, entitled "APPARATUS AND METHOD FOR VERIFYING THE ORIGIN OF TEXTURE MAP IN GRAPHICS PIPELINE PROCESSING," filed on Jun. 23, 2015; and U.S. patent application Ser. No. 14/747,003, entitled "APPARATUS AND METHOD FOR VERIFYING FRAGMENT PROCESSING RELATED DATA IN GRAPHICS PIPELINE PROCESSING," filed on Jun. 23, 2015.

FIELD OF THE INVENTION

The present invention relates generally to the field of graphics processing and more specifically to an apparatus and method for verifying GPU mapped textures in displayable image data.

BACKGROUND

A typical computing system includes a central processing unit (CPU) and a graphics processing unit (GPU). Some GPUs are capable of very high performance using a relatively large number of small, parallel execution threads on dedicated programmable hardware processing units. The specialized design of such GPUs usually allows these GPUs to perform certain tasks, such as rendering 3-D scenes, much faster than a CPU. However, the specialized design of these GPUs also limits the types of tasks that the GPU can perform. The CPU is typically a more general-purpose processing unit and therefore can perform most tasks. Consequently, the CPU usually executes the overall structure of the software application and configures the GPU to perform specific tasks in the graphics pipeline (the collection of processing steps performed to transform 3-D images into 2-D images).

Such graphics processing units (GPUs) are performance optimized but lack fault detection and handling required for functional safety. Functional safety is a primary issue when displaying safety relevant information to a user. Safety relevant or safety related information represents information, an erroneous content of which might be directly responsible for death, injury or occupational illness, or the erroneous content of which may be the basis for decisions relied on, which might cause death, injury, other significant harms or other significant actions. Safety relevant or safety related information may be the output of safety critical application typically operated in a safety critical environment, which is one in which a computer software activity (process, functions, etc.) whose errors, such as inadvertent or unauthorized occurrences, failure to occur when required, erroneous values, or undetected hardware failures can result in a potential hazard, or loss of predictability of system outcome.

The lack of fault detection and handling required for functional safety in prior art graphics processing units (GPUs) may result in an unnoticed displaying of an erroneous or incomplete image, for example due to a fault in the hardware or software, which may result in a dangerous action for a user relying on the information conveyed by the wrong image.

Accordingly, what is needed in the art is a fault detection and handling required for functional safety for graphics processing units (GPUs) processing graphical content including safety relevant information to be presented to a user.

SUMMARY

The present invention provides an apparatus for verifying the integrity of image data comprising mapped texture data, a method of operating thereof and a non-transitory, tangible computer readable storage medium bearing computer executable instructions for verifying the integrity of image data comprising mapped texture data as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Embodiments of the present disclosure will be described below in detail with reference to drawings. Note that the same reference numerals are used to represent identical or equivalent elements in figures, and the description thereof will not be repeated. The embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

In today's car instrument panels integrate information originating from various sources in from of graphical representations on one or more displays. Typical sources generating graphical representations may be classified in safety relevant sources and non-safety relevant sources. Safety relevant sources are sources, which generate graphical representations to be displayed to a user of the car, which convey safety relevant information to the car's user.

Safety relevant information generated by safety relevant sources may comprises information relating to, for example, the current velocity of the car, head lamp control, engine temperature, ambient environment, condition and status of a brake system including e.g. an anti-lock braking system (ABS) or an electronic brake-force distribution system (EBD), condition and status of an electrical steering system including e.g. an electronic stability control system (ESC), a traction control system (TCS) or anti-slip regulation system (ASR), or indications and status of advanced driver assistance systems (ADAS) including e.g. an adaptive cruise control (ACC) system, a forward collision warning (FCW) system, a lane departure warning (LDW) system, a blind spot monitoring (BSM) system, a traffic sign recognition (TSR) system, just to name a few.

Non-safety relevant information generated by non-safety relevant sources may comprises information relating to, for example, a navigation system, a multimedia system, and comfort equipment such as automatic climate control, just to name a few.

The information generated by safety and non-safety relevant sources are composed and presented in form of graphical representations on the one or more displays of the car. It is immediately understood that fault detection and handling required for functional safety have to be implemented allow detecting whether at least the graphical representations conveying safety relevant information are displayed completely and unaltered to the user of the car such. In particular, graphics processing units (GPU), which allow to efficiently generate complex graphical representations on displays, represent a major challenge for implementing fault detection and handling required for functional safety.

In particular, safety relevant information may be comprised in graphical representations provided in form of texture image data to be mapped on one or more object surfaces defined on the basis of graphics primitives. The texture image data may be dynamically generated image data such as a video stream of image frame data or may be provided in form of static image data or precomputed image data such as from a look-up table comprising engine status related symbols, traffic signs, traffic maps etc.

In case safety relevant information is provided in form of texture image data, the texture mapping or texture sampling process is crucial since any software and/or hardware failures occurring in conjunction with the texture processing at the graphics processing units (GPU) may render the graphical representations of the safety relevant information unrecognizable for a user, who is addressed by the displayed safety relevant information.

Figure 1:
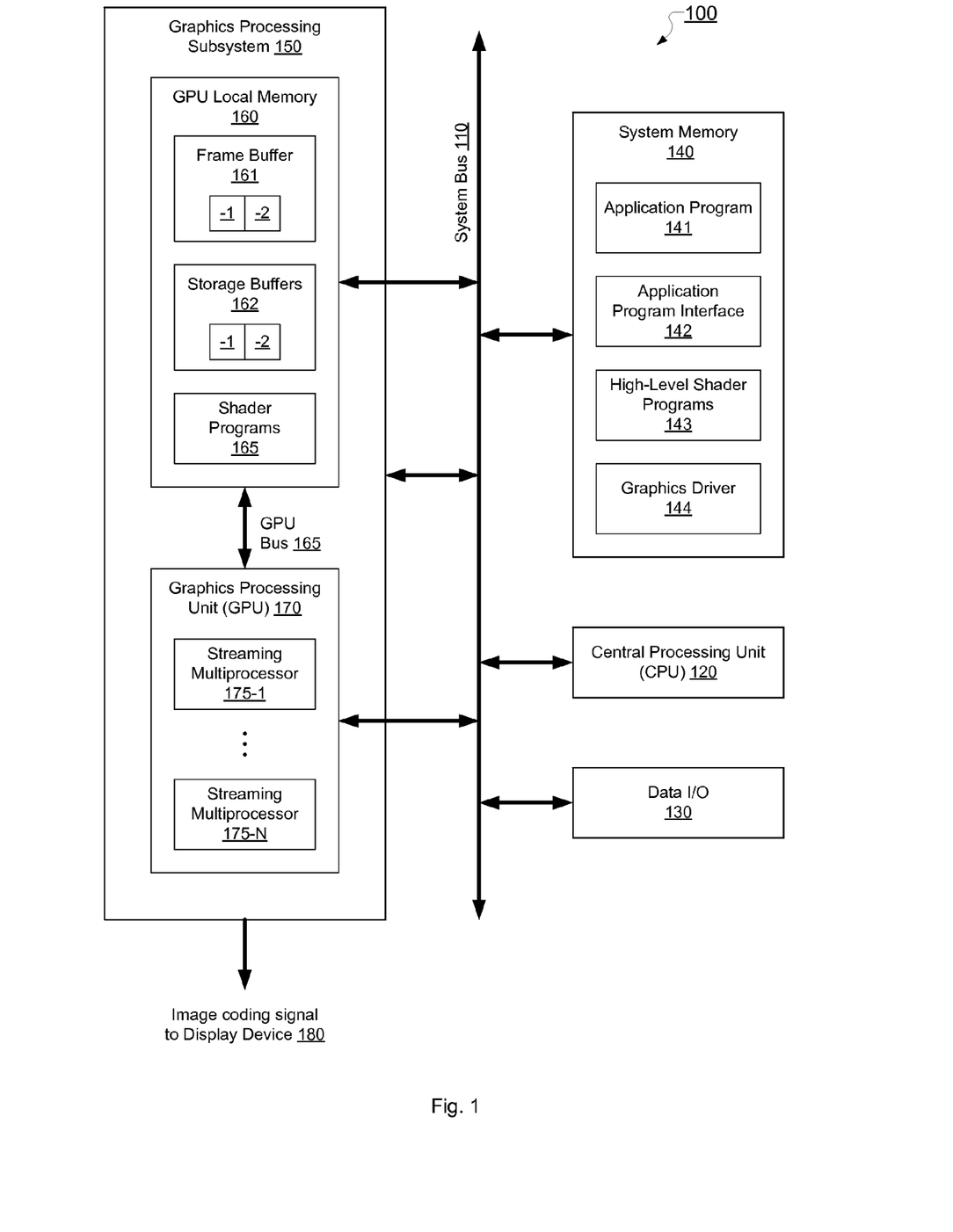
FIG. 1 schematically illustrates a block diagram of a computing system with a graphics processing subsystem according to an example of the present invention.

FIG. 1 shows is a schematic block diagram of a computing system 100 with a programmable graphics processing subsystem 150 according to an example of the present application. As shown, the computing system 100 includes a system data bus 110, a central processing unit (CPU) 120, one or more data input/output units 130, a system memory 140, and a graphics processing subsystem 150, which is coupled to a one or more display devices 180. In further examples, the CPU 120, at least portions of the graphics processing subsystem 150, the system data bus 110, or any combination thereof, may be integrated into a single processing unit. Further, the functionality of the graphics processing subsystem 150 may be included in a chipset or in some other type of special purpose processing unit or co-processor.

The system data bus 110 interconnects the CPU 120, the one or more data input/output units 130, the system memory 140, and the graphics processing subsystem 150. In further examples, the system memory 140 may connect directly to the CPU 120. The CPU 120 receives user input and/or signals from one or more the data input/output units 130, executes programming instructions stored in the system memory 140, operates on data stored in the system memory 140, and configures the graphics processing subsystem 150 to perform specific tasks in the graphics pipeline. For example, the CPU 120 may read a rendering method and corresponding textures a data storage, and configure the graphics processing subsystem 150 to implement this rendering method. The system memory 140 typically includes dynamic random access memory (DRAM) used to store programming instructions and data for processing by the CPU 120 and the graphics processing subsystem 150. The graphics processing subsystem 150 receives instructions transmitted by the CPU 120 and processes the instructions in order to render and display graphics images on the one or more display devices 180.

The system memory 140 includes an application program 141, an application programming interface (API) 142, high-level shader programs 143, and a graphics processing unit (GPU) driver 144. The application program 141 generates calls to the API 142 in order to produce a desired set of results, typically in form of a sequence of graphics images. The application program 141 also transmits one or more high-level shading programs 143 to the API 142 for processing within the GPU driver 144. The high-level shading programs 143 are typically source code text of high-level programming instructions that are designed to operate on one or more shaders within the graphics processing subsystem 150. The API 142 functionality is typically implemented within the GPU driver 144. The GPU driver 144 is configured to translate the high-level shading programs 143 into machine code shading programs that are typically optimized for a specific type of shader (e.g., vertex, geometry, or fragment) of the graphics pipeline.

The graphics processing subsystem 150 includes a graphics processing unit (GPU) 170, a GPU local memory 160, and a GPU data bus 165. The GPU 170 is configured to communicate with the GPU local memory 160 via the GPU data bus 165. The GPU 170 may receive instructions transmitted by the CPU 120, process the instructions in order to render graphics data and images, and store these images in the GPU local memory 160. Subsequently, the GPU 170 may display certain graphics images stored in the GPU local memory 160 on the one or more display devices 180.

The GPU 170 includes one or more streaming multiprocessors 175-1 to 175-N. Each of the streaming multiprocessors 175 is capable of executing a relatively large number of threads concurrently. Particularly, each of the streaming multiprocessors 175 can be programmed to execute processing tasks relating to a wide variety of applications, including but not limited to linear and nonlinear data transforms, filtering of video and/or audio data, modeling operations (e.g. applying of physics to determine position, velocity, and other attributes of objects), and so on. Furthermore, each of the streaming multiprocessors 175 may be configured as one or more programmable shaders (e.g., vertex, geometry, or fragment) each executing a machine code shading program (i.e., a thread) to perform image rendering operations. The GPU 170 may be provided with any amount GPU local memory 160, including none, and may use GPU local memory 160 and system memory 140 in any combination for memory operations.

The GPU local memory 160 is configured to include machine code shader programs 165, one or more storage buffers 162 and a configurable number of frame buffers such as the frame buffers 161-1 and 161-2. The machine code shader programs 165 may be transmitted from the GPU driver 144 to the GPU local memory 160 via the system data bus 110. The machine code shader programs 165 may include a machine code vertex shading program, a machine code geometry shading program, a machine code fragment shading program, or any number of variations of each. The storage buffers 162 are typically used to store shading data, generated and/or used by the shading engines in the graphics pipeline. E.g. the storage buffers 162 may comprise one or more vertex data buffers, at least one texture buffer 162-1, 162-2 and/or one or more feedback buffers. A frame buffer 161-1, 161-2 may store displayable image data for at least one two-dimensional surface that may be used to drive the display devices 180. Furthermore, a frame buffer 161-1, 161-2 may include more than one two-dimensional surface. For instance the GPU 170 may be configured to render one two-dimensional surface while a second two-dimensional surface is used to drive the display devices 180.

The display devices 180 are one or more output devices capable of emitting a visual image corresponding to an input data signal. For example, a display device may be built using a cathode ray tube (CRT) monitor, a liquid crystal display, an image projector, or any other suitable image display system. The input data signals to the display devices 180 are typically generated by scanning out the contents of one or more frames of image data that is stored in one or more frame buffers 161-1, 161-2.

It should be noted that the memory of the graphics processing subsystem 150 is any memory used to store graphics data or program instructions to be executed by programmable graphics processor unit 170. The graphics memory may include portions of system memory 140, the local memory 160 directly coupled to programmable graphics processor unit 170, storage resources coupled to the streaming multiprocessors 175 within programmable graphics processor unit 170, and the like. Storage resources can include register files, caches, FIFOs (first in first out memories), and the like.

Moreover, it should be noted that a frame buffer 161-1, 161-2 is not limited to store displayable image data. In general, a frame buffer 161-1, 161-2 may store any data written thereto including also data not intended to be displayed. In the following, the use of a frame buffer 161-2 for storing data not intended to be displayed will be made use of.

Figure 2:
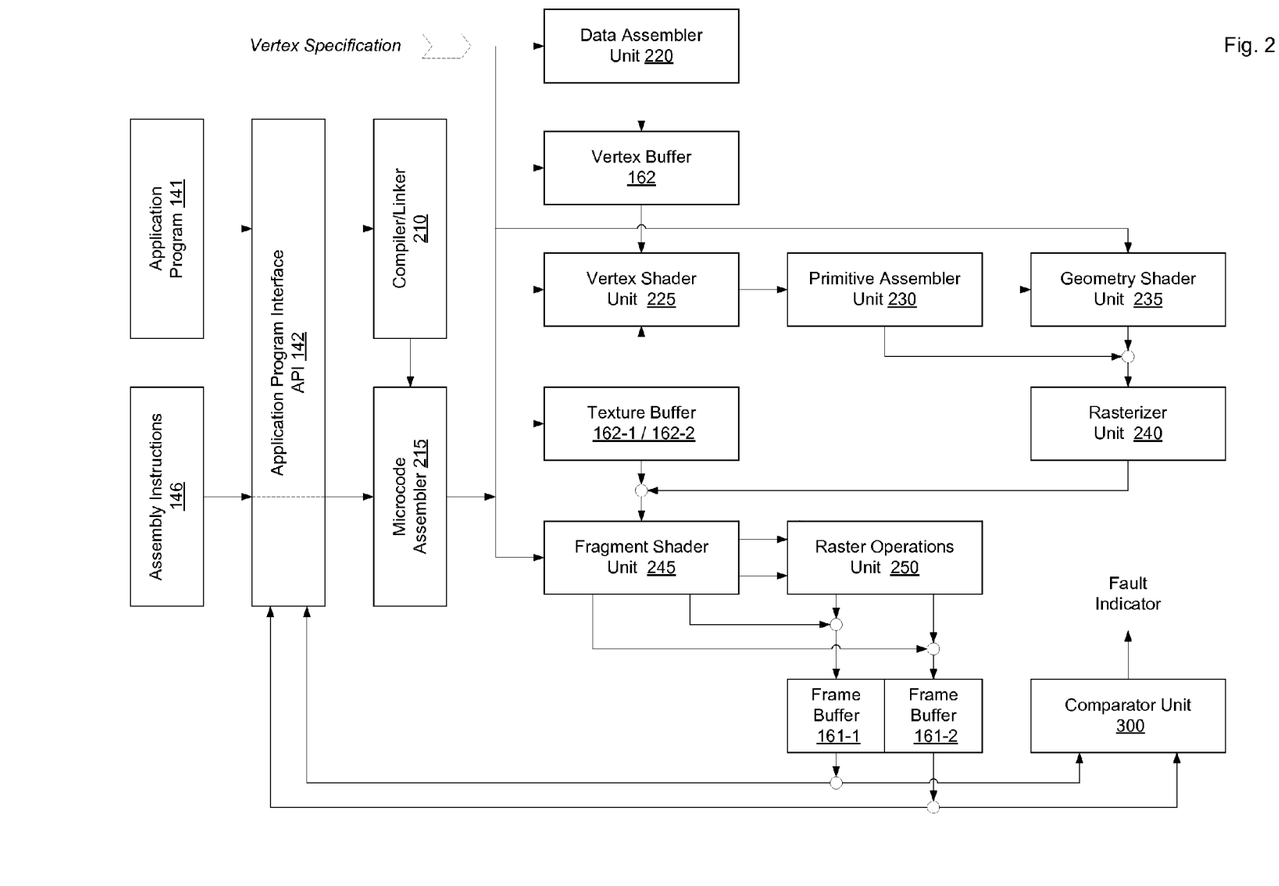
FIG. 2 schematically illustrates a block diagram of a graphics processing pipeline executed at the graphics processing subsystem as shown in FIG. 1 according to an example of the present invention.

FIG. 2 shows a schematic block diagram of a programmable graphics pipeline 200 implementable within the GPU 170 of the graphics processing subsystem 150 exemplified in FIG. 1, according to one example of the application.

As shown, the shader programming model includes the application program 141, which transmits high-level shader programs to the graphics driver 144. The graphics driver 144 then generates machine code programs that are used within the graphics processing subsystem 150 to specify shader behavior within the different processing domains of the graphics processing subsystem 150.

The high-level shader programs transmitted by the application program 141 may include at least one of a high-level vertex shader program, a high-level geometry shader program and a high-level fragment shader program. Each of the high-level shader programs is transmitted through an API 142 to a compiler/linker 210 within the GPU driver 144. The compiler/linker 210 compiles the high-level shader programs 143 into assembly language program objects. Under shader programming model, domain-specific shader programs, such as high-level vertex shader program, high-level geometry shader program, and high-level fragment shader program, are compiled using a common instruction set target, supported by an instruction set library. With the instruction set, application developers can compile high-level shader programs in different domains using a core set of instructions. For example, compiler/linker 210 translates the high-level shader programs designated for different domains (e.g., the high-level vertex shader program, the high-level geometry shader program, and the high-level fragment shader program), which are written in high-level shading language, into distinct compiled software objects in the form of assembly code.

The program objects are transmitted to the microcode assembler 215, which generates machine code programs, including a machine code vertex shader program, a machine code geometry shader program and a machine code fragment shader program. The machine code vertex shader program is transmitted to a vertex processing unit 225 for execution. Similarly, the machine code geometry shader program is transmitted to a primitive processing/geometry shader unit 235 for execution and the machine code fragment shader program is transmitted to a fragment processing unit 245 for execution.

The compiler/linker 210 and the microcode assembler 215 form the hardware related driver layer of the graphics driver 144, which interfaces with the application program 141 through the application program interface, API, 142.

In an example of the present application, shader programs may be also transmitted by the application program 141 via assembly instructions 146. The assembly instructions 146 are transmitted directly to the GPU microcode assembler 215 which then generates machine code programs, including a machine code vertex shader program, a machine code geometry shader program and a machine code fragment shader program.

A data assembler 220 and the vertex shader unit 225 interoperate to process a vertex stream. The data assembler 220 is a fixed-function unit that collects vertex data for high-order surfaces, primitives, and the like, and outputs the vertex data to vertex shader unit 225. The data assembler 260 may gather data from buffers stored within system memory 140 and GPU local memory 160, such as the vertex buffer 162-1, as well as from API calls from the application program 141 used to specify vertex attributes. The vertex shader unit 225 is a programmable execution unit that is configured to execute a machine code vertex shader program, transforming vertex data as specified by the vertex shader programs. For example, vertex shader unit 225 may be programmed to transform the vertex data from an object-based coordinate representation (object space) to an alternatively based coordinate system such as world space or normalized device coordinates (NDC) space. The vertex shader unit 225 may read vertex attribute data directly from the GPU local memory 160. The vertex shader unit 225 may read texture map data as well as uniform data that is stored in GPU local memory 160 through an interface (not shown) for use in processing the vertex data. The vertex shader 225 represents the vertex processing domain of the graphics processing subsystem 150.

A primitive assembler unit 230 is fixed-function unit that receives transformed vertex data from vertex shader unit 225 and constructs graphics primitives, e.g., points, lines, triangles, or the like, for processing by the geometry shader unit 235 or the rasterizer unit 240. The constructed graphics primitives may include a series of one or more vertices, each of which may be shared amongst multiple primitives, and state information, such as a primitive identifier, defining the primitive. In alternative examples, a second primitive assembler (not shown) may be included subsequent to the geometry shader 235 in the data flow through the graphics pipeline 200. Each primitive may include a series of one or more vertices and primitive state information defining the primitive. A given vertex may be shared by one or more of the primitives constructed by the primitive assembly unit 230 throughout the graphics pipeline 200. For example, a given vertex may be shared by three triangles in a triangle strip without replicating any of the data, such as a normal vector, included in the given vertex.

The geometry shader unit 235 receives the constructed graphics primitives from the primitive assembler unit 230 and performs fixed-function viewport operations such as clipping, projection and related transformations on the incoming transformed vertex data. In the graphics processing subsystem 150, the geometry shader unit 235 is a programmable execution unit that is configured to execute machine code geometry shader program to process graphics primitives received from the primitive assembler unit 230 as specified by the geometry shader program. For example, the geometry shader unit 235 may be further programmed to subdivide the graphics primitives into one or more new graphics primitives and calculate parameters, such as plane equation coefficients, that are used to rasterize the new graphics primitives. The geometry shader unit 235 may read data directly from the GPU local memory 160. Further, the geometry shader unit 235 may read texture map data that is stored in GPU local memory 160 through an interface (not shown) for use in processing the geometry data. The geometry shader unit 235 represents the geometry processing domain of the graphics processing subsystem 150. The geometry shader unit 235 outputs the parameters and new graphics primitives to a rasterizer unit 240. It should be noted that the geometry shader unit 235 is an optional unit of the graphics pipeline. The data processing of the geometry shader unit 235 may be omitted.

The rasterizer unit 240 receives parameters and graphics primitives from the primitive assembler unit 230 or the geometry shader unit 235. The rasterizer unit 240 is a fixed-function unit that scan-converts the graphics primitives and outputs fragments and coverage data to the fragment shader unit 245.

The fragment shader unit 245 is a programmable execution unit that is configured to execute machine code fragment shader programs to transform fragments received from rasterizer unit 245 as specified by the machine code fragment shader program. For example, the fragment shader unit 245 may be programmed to perform operations such as perspective correction, texture mapping, shading, blending, and the like, to produce shaded fragments that are output to a raster operations unit 250. The fragment shader unit 245 may read data directly from the GPU local memory 160. Further, the fragment shader unit 245 may read texture map data as well as uniform data that is stored in GPU local memory 160, such as the texture buffer 162-2, through an interface (not shown) for use in processing the fragment data.

The raster operations unit 250 or per-fragment operations unit optionally performs fixed-function computations such as near and far plane clipping and raster operations, such as stencil, z test and the like, and outputs pixel data as processed graphics data for storage in a buffer in the GPU local memory 160, such as the frame buffer 161-1. In particular, the raster operations unit 250 optionally performs near and far plane clipping and raster operations using the fragment data and pixel data stored in a frame buffer 161-1 at a pixel position associated with processed fragment data and the output data from the raster operations unit 250 is written back to the frame buffer 161-1 at the pixel position associated with the output data.

Figure 3:
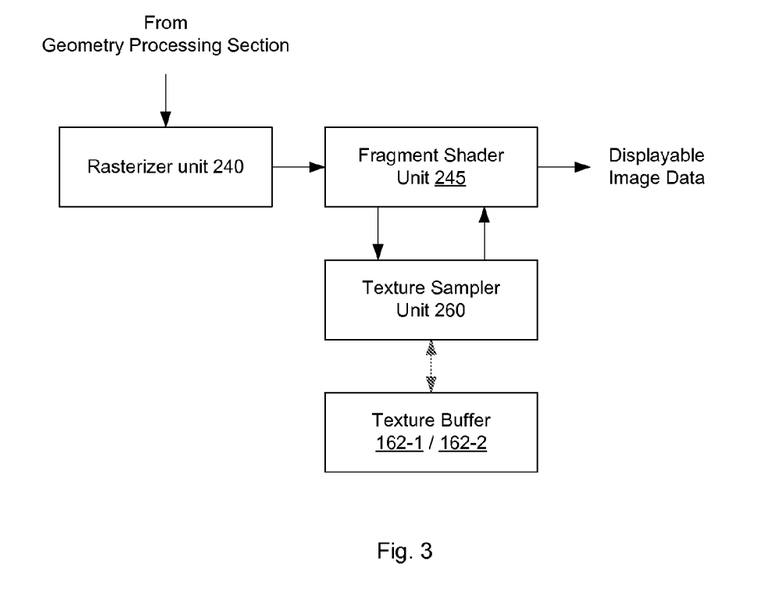
FIG. 3 schematically illustrates a further block diagram of a graphics processing pipeline executed at the graphics processing subsystem as shown in FIG. 1 according to an example of the present invention.

Referring now to FIG. 3, a further block diagram of a graphics processing pipeline executed at the graphics processing subsystem as exemplified with reference to FIG. 1 is schematically illustrates.

The graphics processing pipeline 200 may be logically partitioned into a geometry processing section 260 comprising the vertex shader unit, primitive assembler 230 and geometry shader 235 and a fragment processing section comprising the fragment shader unit 245 and the optional raster operations unit 250, each of which performs a variety of computational functions. Some of these functions are table lookup, scalar and vector addition, multiplication, division, coordinate-system mapping, calculation of vector normals, calculation of derivatives, interpolation, filtering, and the like. Geometry processing section and fragment processing are optionally configured such that data processing operations are performed in multiple passes through graphics processing section or in multiple passes through fragment processing section. Each pass through programmable graphics processing section or fragment processing section may conclude with optional processing by a raster operations unit 250.

Geometry processing section receives a stream of program instructions (vertex program instructions and geometry shader program instructions) and data and performs vector floating-point operations or other processing operations using the data.

In particular, a vertex refers to a data structure, which describes position of a point in 2D or 3D space and further attributes associated therewith. A set of vertices defines the location of corners of one or more surfaces constructed of basic graphical elements, which are also denoted as primitives, and other attributes of the surfaces. Each object to be displayed is typically approximated as a polyhedral. A polyhedral a solid in three dimensions with flat faces, straight edges and sharp corners or vertices. The flat faces are joined at their edges. The flat faces are modeled as primitives, the corners of which are defined by a respective set of vertices. The set of vertices define inter alia the location and orientation of the primitive in space. The attributes of a vertex may include a color value at the vertex point, a reflectance value of the surface at the vertex, one or more textures stored in one or more texture buffers and texture coordinates of the surface at the vertex, and the normal of an approximated curved surface at the location of the vertex. The vertex data is provided as an ordered list of vertices, a vertex stream, to the graphics pipeline described herein. The interpretation of the stream of vertices associates each vertex with one or more primitives out of a list of predefined primitives supported by the graphics processing pipeline, such as e.g. point primitives, line primitives, polygon primitives, triangle primitives, quad primitives and variants thereof.

Data processed by geometry processing section and program instructions are passed to the rasterizer unit 240, which interfaces the geometry processing section with the fragment processing section. The rasterizer unit 240 is a sampling unit that processes primitives and generates sub-primitive data, such as fragment data, including parameters associated with fragments (texture identifiers, texture coordinates, and the like). The rasterizer unit 240 converts the primitives into sub-primitive data by performing scan conversion on the data processed by geometry processing section. The rasterizer unit 240 may be configured to generate fragments in form one pixel fragment blocks or in form of N×M fragment blocks comprising contiguous and/or continuous regions of fragments, e.g. blocks comprising eight contiguous pixel fragments, where N and M are both integers. The rasterizer unit 240 outputs fragment data to fragment shader unit 245. The fragment data may include a coverage mask for each pixel group that indicates which pixels are covered by the fragment. In particular, the rasterizer unit 240 provides pixel fragments, and/or pixel fragment blocks and/or associated attributes to fragment shader unit 245.

Figure 4:
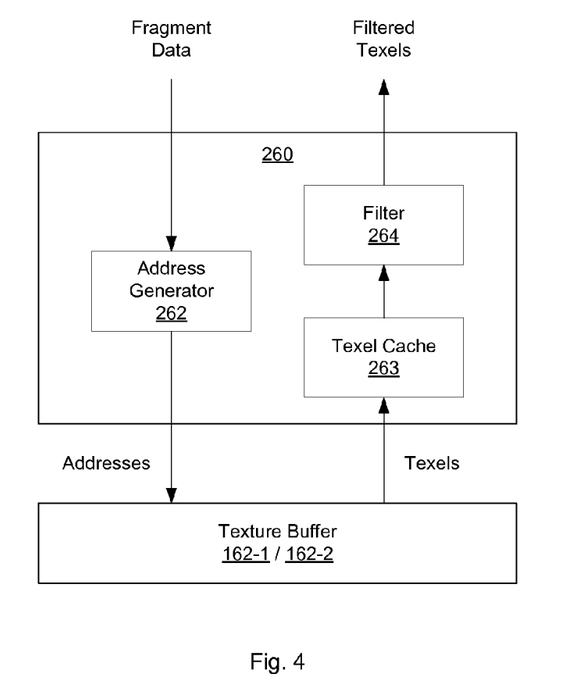
FIG. 4 schematically illustrates a block diagram of a texture sampler unit of FIG. 3 according to an example of the present application.

The fragment shader unit 245 of the graphics pipeline 200 is configured to perform texture mapping to apply a texture map to the surface of a primitive. Texture maps are provided in one or more texture buffers 162-2, which are in particular read-only buffers or used as read-only buffers. The texture maps stored in the texture buffers are two-dimensional data but can be one- or three-dimensional as well. To allows for texture mapping, the vertices of the primitive are associated with coordinates in the texture map, and each pixel of the surface defined by the primitive is then associated with specific texture coordinates in the texture map. Texturing is achieved by modifying the color of each pixel of the surface defined by the primitive with the color of the texture map at the location indicated by that pixel's texture coordinates to produce shaded fragments. The texturing of the surface of the primitive is specified by the machine code fragment shader program executed by the fragment shader unit 245.

Starting from the above description, those skilled in the art understand that the texture sampling, in particular the sampling of texture image data comprising graphical representations rendering safety relevant information, is a crucial image processing operation in view of safety requirements.

In order to enable a verification of the texture sampling, redundancy of the texture sampler operation is suggested. Two examples thereof will be described in the following with reference to FIGS. 5 and 6 as well as FIGS. 7 and 8.

Figure 5:
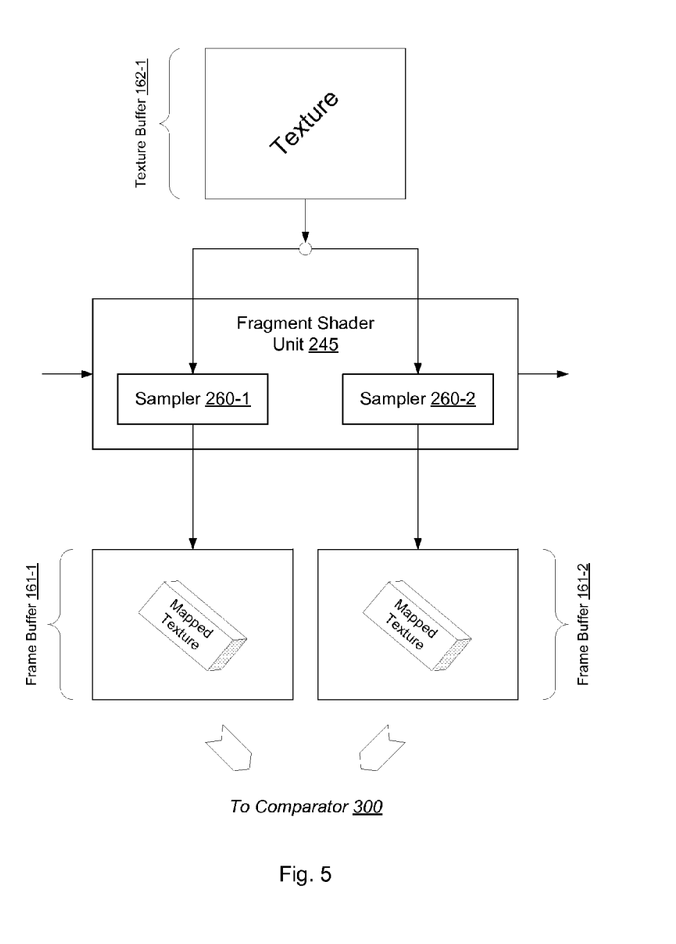
FIG. 5 illustrates a schematic diagram of the verification of image data generated using texture samplers according to a first example of the present invention.
Figure 6:
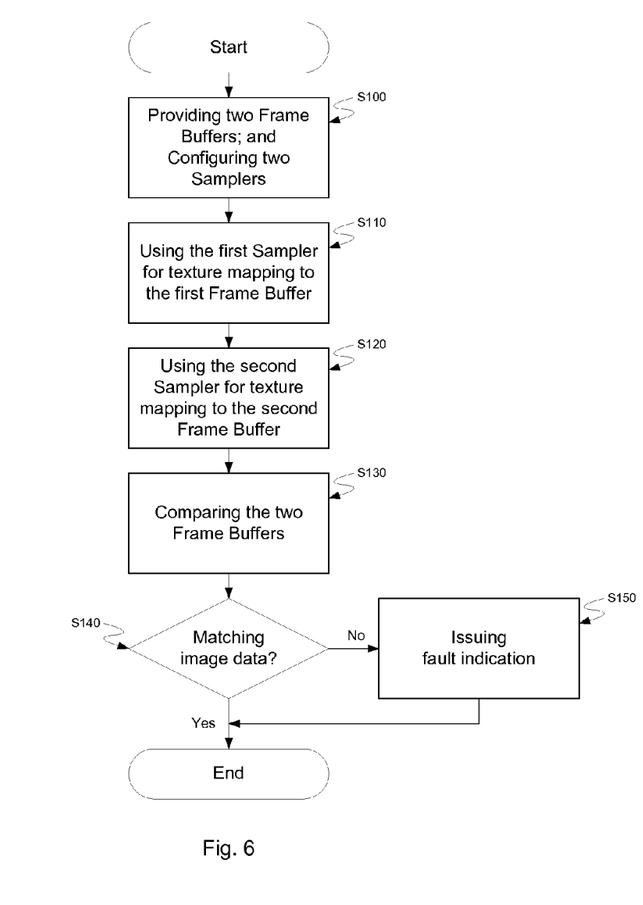
FIG. 6 schematically illustrates a flow diagram relating to a method for verification of image data generated using texture samplers as shown in FIG. 5 according to the first example of the present invention.

Referring now to FIGS. 5 and 6, a block diagram and a flow diagram illustrating a first example of redundant texture sampler operation enabling verification thereof are schematically illustrated.

A texture buffer 162-1 is provided, which stores a texture map comprising a plurality of texels forming texture image data.

At a stage S100, a first texture sampler unit 260-1 of the fragment shader unit 245 is configured to read texels from the texture buffer 162-1 and to include the filtered texels determined by the texture sampler unit 260-1 into image data stored in a first frame buffer 161-1. The first frame buffer 161-1 is allocate and associated to the first texture sampler unit 260-1. The At the stage S100, a second texture sampler unit 260-2 of the fragment shader unit 245 is configured to read texels from the texture buffer 162-1 and to include the filtered texels determined by the texture sampler unit 260-2 into image data stored in a second frame buffer 161-2. The second frame buffer 161-2 is allocate and associated to the first texture sampler unit 260-2.

The fragment shader unit 245 is configured to receive the fragment data from the rasterizer unit 240 and to supply the fragment data to both the first texture sampler unit 260-1 and the second texture sampler unit 260-2. The first texture sampler unit 260-1 and the texture sampler unit 260-2 are configured to apply the same filtering process to the texels to produce shaded or texture mapped fragments.

At a stage S110, the fragment shader unit 245 invokes the first texture sampler unit 260-1 for texture mapping based on the texture data received from the rasterizer unit 240 and to include the filtered texels received from the first texture sampler unit 260-1 into the first frame buffer 161-1.

At a stage S120, the fragment shader unit 245 invokes the second texture sampler unit 260-2 for texture mapping based on the texture data received from the rasterizer unit 240 and to include the filtered texels received from the first texture sampler unit 260-2 into the second frame buffer 161-2.

Hence, the first and second texture sampler units operate on the same fragment data received by the fragment shader unit 245 from the rasterizer unit 240. The first and second texture sampler units may be operated simultaneously or at different point in times.

In order to verify the operation of the texture mapping, the comparator unit 300 is configured to compare the image data stored in the first frame buffer 161-1 and the second frame buffer 161-2 in an operation S130. In case the texture mapping using the first and second texture sampler units performed faultlessly, the image data stored in the first frame buffer 161-1 and the second frame buffer 161-2 is identical. Hence, the comparison result indicates that the first frame buffer 161-1 and the second frame buffer 161-2 comprises the same image data. Otherwise in case the comparison result indicates that the image data of the first frame buffer 161-1 and image data of the second frame buffer 161-2 differ from each other (do not match), a fault indication signal or message is generated in an operation S150.

Figure 7:
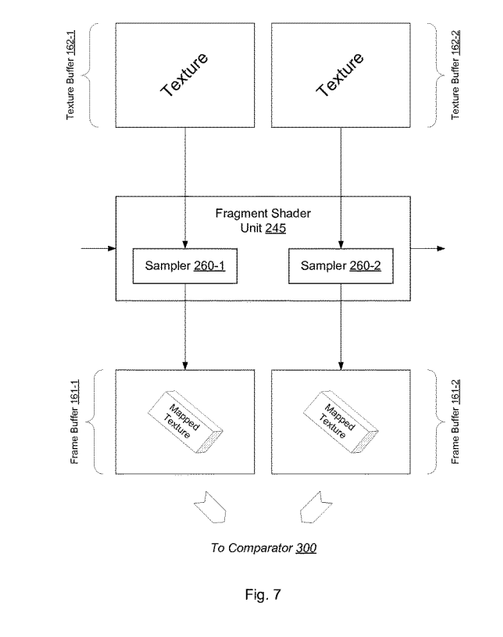
FIG. 7 illustrates a schematic diagram of the verification of image data generated using texture samplers according to a second example of the present invention.
Figure 8:
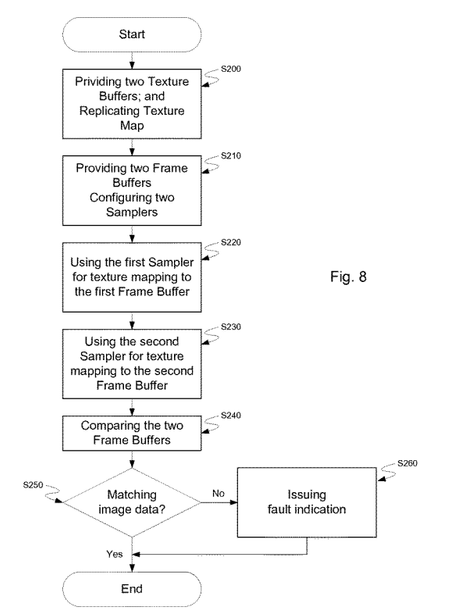
FIG. 8 schematically illustrates a flow diagram relating to a method for verification of image data generated using texture samplers as shown in FIG. 7 according to the second example of the present invention.

Referring now to FIGS. 7 and 8, a block diagram and a flow diagram illustrating a second example of redundant texture sampler operation enabling verification thereof are schematically illustrated.

A first texture buffer 162-1 is provided, which stores a texture map comprising a plurality of texels forming texture image data.

A second texture buffer 162-2 is provided.

At a stage S200, the texture image data comprises in the first texture buffer 162-1 is replicated and stored in the second texture buffer 162-2. Hence, the first texture buffer 162-1 and the second texture buffer 162-2 comprises the same texture image data.

At a stage S210, a first texture sampler unit 260-1 of the fragment shader unit 245 is configured to read texels from the first texture buffer 162-1 and to include the filtered texels determined by the texture sampler unit 260-1 into image data stored in a first frame buffer 161-1. The first frame buffer 161-1 is allocate and associated to the first texture sampler unit 260-1.

At the stage S210, a second texture sampler unit 260-2 of the fragment shader unit 245 is configured to read texels from the second texture buffer 162-2 and to include the filtered texels determined by the texture sampler unit 260-2 into image data stored in a second frame buffer 161-2. The second frame buffer 161-2 is allocate and associated to the first texture sampler unit 260-2.

The fragment shader unit 245 is configured to receive the fragment data from the rasterizer unit 240 and to supply the fragment data to both the first texture sampler unit 260-1 and the second texture sampler unit 260-2.

At a stage S220, the fragment shader unit 245 invokes the first texture sampler unit 260-1 for texture mapping based on the texture data received from the rasterizer unit 240 and to include the filtered texels received from the first texture sampler unit 260-1 into the first frame buffer 161-1.

At a stage S230, the fragment shader unit 245 invokes the second texture sampler unit 260-2 for texture mapping based on the texture data received from the rasterizer unit 240 and to include the filtered texels received from the first texture sampler unit 260-2 into the second frame buffer 161-2.

Hence, the first and second texture sampler units operate on the same fragment data received by the fragment shader unit 245 from the rasterizer unit 240. The first texture sampler unit 260-1 performs the texture sampling based on texture map stored in the first texture buffer 162-1 and the second texture sampler unit 260-2 performs the texture sampling based on texture map stored in the second texture buffer 162-2. The first and second texture sampler units may be operated simultaneously or at different point in times.

In order to verify the operation of the texture mapping, the comparator unit 300 is configured to compare the image data stored in the first frame buffer 161-1 and the second frame buffer 161-2 in an operation S240. In case the texture mapping using the first and second texture sampler units performed faultlessly, the image data stored in the first frame buffer 161-1 and the second frame buffer 161-2 is identical. Hence, the comparison result indicates that the first frame buffer 161-1 and the second frame buffer 161-2 comprises the same image data. Otherwise in case the comparison result indicates that the image data of the first frame buffer 161-1 and image data of the second frame buffer 161-2 differ from each other (do not match), a fault indication signal or message is generated in an operation S260.

Starting from the above examples, those skilled in the art appreciate that the comparator 300 may be configured to compare the total image data stored in the frame buffers 161-1, 161-2 with each other. Alternatively, the comparator unit 300 may extract pixel data (pixel color value data) within one or more predefined areas of the image data stored in the frame buffers 161-1 and 161-2 and compare the extracted pixel data with each other to verify the integrity of the image data. The one or more predefined area comprise mapped texture data.

In an example of the present application, the comparator 300 is configured to determine checksums based on the pixel data (pixel color value data) stored in each frame buffer 161-1 and 161-2 and compare the determined checksums to verify the integrity of the image data. The checksum may be for instance determined in accordance with a cyclic redundancy check (CRC) algorithm, checksum algorithm a cryptographic hash function algorithm or a non-cryptographic hash function algorithm.

According to an example of the present application, an apparatus for verifying the integrity of image data comprising mapped texture data is provided, which comprises a first frame buffer 161-1 and a second frame buffer 161-2 each to buffer displayable image data; at least one texture buffer 162-1, 162-2 to store texture data; a graphics processing pipeline 200 having a fragment shader unit 245 with a first texture sampler unit 260-1 and a second texture sampler unit 260-2; a comparator unit 300. The fragment shader unit 245 is coupled to the first and second frame buffers 161-1, 161-2 and the at least one texture buffer 162-1, 162-2. The first texture sampler unit 260-1 is configured to output texture mapped fragments based on the texture data in the at least one texture buffer 162-1, 162-2 to the first frame buffer 161-1. The second texture sampler unit 260-2 is configured to output texture mapped fragments based on the texture data in the at least one texture buffer 162-1, 162-2 to the second frame buffer 161-2. The comparator unit 300 is coupled to the first and second frame buffers 161-1, 161-2. The comparator unit 300 is further configured to compare the image data stored in the first frame buffer 161-1 with the image data stored in the second frame buffer 161-2; and to issue a fault indication signal in case the image data of the first frame buffer 161-1 and the second frame buffer 161-2 mismatch, e.g. do not comply with each other.

According to an example of the present application, the fragment shader unit 245 is configured to receive fragment data. The first texture sampler unit 260-1 is configured to operate on the received fragment data. The second texture sampler unit 260-2 is configured to operate on the received fragment data.

According to an example of the present application, wherein the first texture sampler unit 260-1 is configured to read texture data from the at least one texture buffer 162-1, 162-2 in response to the received fragment data; and the second texture sampler unit 260-2 is configured to read texture data from the at least one texture buffer 162-1, 162-2 in response to the received fragment data.

According to an example of the present application, the apparatus further comprises a first texture buffer 162-1 and a second texture buffer 162-2. The second texture buffer 162-2 is provided to buffer texture data replicated from the first texture buffer 162-1.

According to an example of the present application, the first texture sampler unit 260-1 is further configured to operate on the texture data of the first texture buffer 162-1; and the second texture sampler unit 260-2 is further configured to operate on the texture data of the second texture buffer 162-2.

According to an example of the present application, the first texture sampler unit 260-1 is further configured to read texture data from the first texture buffer 162-1 in response to the received fragment data; and the second texture sampler unit 260-2 is configured to read texture data from the second texture buffer 162-2 in response to the received fragment data.

According to an example of the present application, the apparatus further comprises a rasterizer unit 240, which is comprised by the graphics processing pipeline 200 and which is configured to generate the fragment data. The fragment shader unit 245 is coupled to the rasterizer unit 240 and further configured to receive the fragment data from the rasterizer unit 240.

According to an example of the present application, the first texture sampler unit 260-1 and the second first texture sampler unit 260-2 are further configured to apply the same filtering operation on the texture data read from the at least one texture buffer 162-1, 162-2.

According to an example of the present application, a method for verifying the integrity of image data comprising mapped texture data is provided. The method comprises providing a first frame buffer 161-1 and a second frame buffer 161-2 each for buffering displayable image data; providing at least one texture buffer 162-2 with texture data; configuring a first texture sampler unit 260-1 at a fragment shader unit 245 of a graphics processing pipeline 200 to output texture mapped fragments based on the texture data of the least one texture buffer 162-2 to the first frame buffer 161-1; configuring a second texture sampler unit 260-2 at the fragment shader unit 245 to output texture mapped fragments based on the texture data of the least one texture buffer 162-2 to the first frame buffer 161-2: comparing the image data stored in the first frame buffer 161-1 with the image data stored in the second frame buffer 161-2; and issuing a fault indication signal in case the image data of the first frame buffer 161-1 and the second frame buffer 161-2 mismatch with each other, e.g. do not comply with each other.

According to an example of the present application, the method further comprises receiving fragment data at the fragment shader unit 245; operating the first texture sampler unit 260-1 on the received fragment data; and operating the second texture sampler unit 260-2 on the received fragment data.

According to an example of the present application, the method further comprises reading texture data by the first texture sampler unit 260-1 from the at least one texture buffer 162-1, 162-2 in response to the received fragment data; and reading texture data by the second texture sampler unit 260-2 from the at least one texture buffer 162-1, 162-2 in response to the received fragment data.

According to an example of the present application, the method further comprises providing a first texture buffer 162-1 and a second texture buffer 162-2; and replicating the texture data of the first texture buffer 162-1 in the second texture buffer 162-2.

According to an example of the present application, the method further comprises configuring the first texture sampler unit 260-1 to operate on the texture data of the first texture buffer 162-1; and configuring the second texture sampler unit 260-2 to operate on the texture data of the second texture buffer 162-2.

According to an example of the present application, the method further comprises reading texture data by the first texture sampler unit 260-1 from the first texture buffer 162-1 in response to the received fragment data; and reading texture data by the second texture sampler unit 260-2 from the second texture buffer 162-2 in response to the received fragment data.

According to an example of the present application, the method further comprises generating the fragment data at a rasterizer unit 240, which is comprised by the graphics processing pipeline 200 and coupled to the fragment shader unit 245.

According to an example of the present application, the method further comprises configuring the first texture sampler unit 260-1 and the second first texture sampler unit 260-2 to apply the same filtering operation on the texture data read from the at least one texture buffer 162-1, 162-2.

According to an example of the present application a non-transitory, tangible computer readable storage medium is provided bearing computer executable instructions for verifying the integrity of image data comprising mapped texture data, when executing on one or more processing devices, cause the one or more processing devices to perform a method comprising: configuring a first texture sampler unit 260-1 at a fragment shader unit 245 of a graphics processing pipeline 200 to output texture mapped fragments based on texture map data in at least one texture buffer to a first frame buffer 161-1; configuring a second texture sampler 260-2 at the fragment shader unit 245 of the graphics processing pipeline 200 to output texture mapped fragments based on the texture map data in the at least one texture buffer 162-2 to a second frame buffer 161-2; comparing the image data stored in the first frame buffer 161-1 with the image data stored in the second frame buffer 161-2; and issuing a fault indication signal in case the image data of the first frame buffer (161-1) and the second frame buffer 161-2 mismatch, e.g. in case the image data of the first and second frame buffers 161-1, 161-2 do not comply with each other. Each of the first frame buffer 161-1 and the second frame buffer 161-2 is provided to buffer displayable image data. The at least one texture buffer 162-2 is provided to buffer texture data.

Descriptions made above with reference to FIG. 1 through FIG. 8 may be applied to the present embodiment as is and thus, further detailed descriptions will be omitted here.

The processing method and apparatus according to the above-described examples may use one or more processors, which may include a microprocessor, central processing unit (CPU), digital signal processor (DSP), or application-specific integrated circuit (ASIC), as well as portions or combinations of these and other processing devices.

The examples described herein refer to flowchart illustrations of the apparatus and method for graphics processing using a comparator unit. It will be understood that each block of the flowchart illustrations, and combinations of blocks in the flowchart illustrations, can be implemented by computer program instructions. These computer program instructions can be provided to one or more processors of a general purpose computer, special purpose computer, or other programmable data processing apparatus to produce a machine, such that the instructions, which execute via the one or more processors of the computer or other programmable data processing apparatus, may implement the functions specified in the flowchart block or blocks.

Each block of the flowchart illustrations may represent a unit, module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The terms "module", and "unit," as used herein, may refer to, but is not limited to, a software or hardware component, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/ units may be combined into fewer components and modules/units or further separated into additional components and modules.

Those of skill in the art would further understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To illustrate clearly this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The processing method according to the above-described examples may be recorded in tangible non-transitory computer-readable media including program instructions to implement various operations embodied by a computer. The media may also include, alone or in combination with the program instructions, data files, data structures, and the like. Examples of tangible, non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Those skilled in the art will recognize that the boundaries between the illustrated logic blocks and/or functional elements are merely illustrative and that alternative embodiments may merge blocks or elements or impose an alternate decomposition of functionality upon various blocks or elements. Thus, it is to be understood that the architectures depicted herein are merely exemplary, and that in fact many other architectures can be implemented which achieve the same functionality.

Any arrangement of components to achieve the same functionality is effectively associated such that the desired functionality is achieved. Hence, any two components herein combined to achieve a particular functionality can be seen as associated with each other such that the desired functionality is achieved, irrespective of architectures or intermedial components. Likewise, any two components so associated can also be viewed as being operably connected, or operably coupled, to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as "computer systems".

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to distinguish arbitrarily between the elements such terms describe. Thus, these terms are not necessarily intended to indicate temporal or other prioritization of such elements. The mere fact that certain measures are recited in mutually different claims does not indicate that a combination of these measures cannot be used to advantage.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. An apparatus for verifying the integrity of image data comprising mapped texture data, said apparatus comprising:
 a first frame buffer and a second frame buffer each provided to buffer displayable image data;
 a first texture buffer provided to store first texture data;
 a second texture buffer to store second texture data;
 a graphics processing pipeline comprising a fragment shader circuitry with a first texture sampler circuitry and a second texture sampler circuitry,
  wherein the fragment shader circuitry is coupled to the first and second frame buffers and the at least one texture buffer, the fragment shader circuitry to receive fragment data,
  wherein the first texture sampler circuitry to perform texture sampling on the fragment data based on the first texture data stored in the first texture buffer, and to output texture mapped fragments as image data to the first frame buffer,
  wherein the second texture sampler circuitry to perform texture sampling on the fragment data based on the second texture data stored in the second texture buffer, and to output texture mapped fragments as image data to the second frame buffer;
 a comparator circuit coupled to the first and second frame buffers,
  wherein the comparator circuitry is configured
   to compare the image data stored in the first frame buffer with the image data stored in the second frame buffer; and
   to issue a fault indication signal in case the image data of the first frame buffer and the second frame buffer mismatch, wherein the fault indication identifies a fault in texture mapping of the fragment shader circuitry.

2. The apparatus according to claim 1, further comprising:
 wherein the first texture sampler circuitry is configured to read texture data from the at least one texture buffer in response to the received fragment data;
 wherein the second texture sampler circuitry is configured to read texture data from the at least one texture buffer in response to the received fragment data.

3. The apparatus according to claim 1, further comprising:
 wherein the second texture buffer is provided buffer texture data replicated from the first texture buffer.

4. The apparatus according to claim 3,
 wherein the first texture sampler circuitry is configured to read texture data from the first texture buffer in response to the received fragment data;
 wherein the second texture sampler circuitry is configured to read texture data from the second texture buffer in response to the received fragment data.

5. The apparatus according to claim 1, further comprising:
 a rasterizer circuitry comprised by the graphics processing pipeline and configured to generate the fragment data;
 wherein the fragment shader circuitry is coupled to the rasterizer circuitry and configured to receive the fragment data from the rasterizer circuitry.

6. The apparatus according to claim 1,
 wherein the first texture sampler circuitry and the second first texture sampler circuitry are configured to apply the same filtering operation on the texture data read from the at least one texture buffer.

7. A method for verifying the integrity of image data comprising mapped texture data, said method comprising:
 providing a first frame buffer and a second frame buffer each provided to buffer displayable image data;
 providing a first texture buffer with first texture data;
 providing a second texture buffer with second texture data;
 configuring a first texture sampler circuitry at a fragment shader circuitry of a graphics processing pipeline to perform texture sampling on the fragment data based on the first texture data stored in the first texture buffer, and to output texture mapped fragments as image data to the first frame buffer,
 configuring a second texture sampler circuitry at the fragment shader circuitry of the graphics processing pipeline to perform texture sampling on the fragment data based on the second texture data stored in the second texture buffer, and to output texture mapped fragments as image data to the first frame buffer;
 comparing the image data stored in the first frame buffer with the image data stored in the second frame buffer; and issuing a fault indication signal in case the image data of the first frame buffer and the second frame buffer mismatch, wherein the fault indication identifies a fault in texture mapping of the fragment shader circuitry.

8. The method according to claim 7, further comprising:
reading texture data by the first texture sampler circuitry from the at least one texture buffer in response to the received fragment data; and
reading texture data by the second texture sampler circuitry from the at least one texture buffer in response to the received fragment data.

9. The method according to claim 7, further comprising:
replicating the texture data of the first texture buffer in the second texture buffer.

10. The method according to claim 9, further comprising:
reading texture data by the first texture sampler circuitry from the first texture buffer in response to the received fragment data; and
reading texture data by the second texture sampler circuitry from the second texture buffer in response to the received fragment data.

11. The method according to claim 7, further comprising:
generating the fragment data at a rasterizer circuitry, which is comprised by the graphics processing pipeline and coupled to the fragment shader circuitry.

12. The method according to claim 7, further comprising:
configuring the first texture sampler circuitry and the second first texture sampler circuitry to apply the same filtering operation on the texture data read from the at least one texture buffer.

13. A non-transitory, tangible computer readable storage medium bearing computer executable instructions for verifying the integrity of image data comprising mapped texture data, when executing on one or more processing devices, cause the one or more processing devices to perform a method comprising:
configuring a first texture sampler circuitry at a fragment shader circuitry of a graphics processing pipeline to output texture mapped fragments of received fragment data based on texture map data in a first texture buffer as image data to the first frame buffer;
configuring a second texture sampler circuitry at the fragment shader circuitry of the graphics processing pipeline to output texture mapped fragments of the received fragment data based on the texture map data in a second texture buffer as image data to the second frame buffer;
comparing the image data stored in the first frame buffer with the image data stored in the second frame buffer; and
issuing a fault indication signal in case the image data of the first frame buffer and the second frame buffer mismatch, wherein the fault indication identifies a fault in texture mapping of the fragment shader circuitry.

14. The non-transitory, tangible computer readable storage medium of claim 13, the method further comprising:
replicating the texture data of the first texture buffer in the second texture buffer.

15. The non-transitory, tangible computer readable storage medium of claim 14, the method further comprising:
reading texture data by the first texture sampler circuitry from the first texture buffer in response to the received fragment data; and
reading texture data by the second texture sampler circuitry from the second texture buffer in response to the received fragment data.

16. The non-transitory, tangible computer readable storage medium of claim 13, the method further comprising:
generating the fragment data at a rasterizer circuitry, which is comprised by the graphics processing pipeline and coupled to the fragment shader circuitry.

17. The non-transitory, tangible computer readable storage medium of claim 13, the method further comprising:
configuring the first texture sampler circuitry and the second first texture sampler circuitry to apply the same filtering operation on the texture data read from the at least one texture buffer.

* * * * *